(12) United States Patent
Wollenweber

(10) Patent No.: US 8,391,573 B2
(45) Date of Patent: Mar. 5, 2013

(54) METHOD AND APPARATUS FOR MOTION CORRECTING MEDICAL IMAGES

(75) Inventor: Scott David Wollenweber, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 13/043,757

(22) Filed: Mar. 9, 2011

(65) Prior Publication Data

US 2012/0230556 A1  Sep. 13, 2012

(51) Int. Cl.
*G06K 9/00* (2006.01)
(52) U.S. Cl. ........................................ 382/128; 382/131
(58) Field of Classification Search .................. 382/128, 382/131, 132, 275
See application file for complete search history.

(56) References Cited

U.S. PATENT DOCUMENTS

| 7,221,728 | B2 | 5/2007 | Edic et al. |
| 7,382,852 | B2 | 6/2008 | Edic et al. |
| 7,415,093 | B2 | 8/2008 | Tkaczyk et al. |
| 7,756,565 | B2 | 7/2010 | Salla et al. |
| 2009/0253980 | A1* | 10/2009 | Wollenweber et al. ....... 600/411 |
| 2010/0046821 | A1 | 2/2010 | Manjeshwar et al. |
| 2010/0189324 | A1 | 7/2010 | Wollenweber et al. |
| 2010/0220909 | A1 | 9/2010 | Thielemans et al. |
| 2012/0078089 | A1* | 3/2012 | Wollenweber et al. ....... 600/427 |

* cited by examiner

*Primary Examiner* — Tom Y Lu
(74) *Attorney, Agent, or Firm* — The Small Patent Law Group; Dean D Small

(57) ABSTRACT

A method for reducing, in an image, motion related imaging artifacts includes obtaining a four-dimensional (4D) image dataset of a region of interest, sorting the 4D image dataset into a plurality of gates, generating an image of the region of interest using the plurality of gates, quantifying a selected feature using at least one metric, selecting a reference gate from the plurality of gates based on the quantification of the feature, and registering one or more of the plurality of gates to the reference gate to generate an image of the selected feature. A system and non-transitory computer readable medium configure to implement the method are also described herein.

20 Claims, 5 Drawing Sheets

METHOD AND APPARATUS FOR MOTION CORRECTING MEDICAL IMAGES

BACKGROUND OF THE INVENTION

The subject matter disclosed herein relates generally to imaging systems, and more particularly to an apparatus and method for motion-correcting medical images.

Multi-modality imaging systems exist that scan using different modalities, for example, Computed Tomography (CT), Magnetic Resonance Imaging (MM), Positron Emission Tomography (PET), and Single Photon Emission Computed Tomography (SPECT). During operation, the image quality of the conventional imaging systems may be affected by the motion of the object being imaged. In particular, motion of the imaged object can degrade the image quality. More specifically, image artifacts are produced by movement of the object during image acquisition. Respiratory motion is a common source of involuntary motion in mammals (e.g., people and animals) encountered in medical imaging systems. The respiratory motion may lead to errors during image review, such as when a physician is determining the size of a lesion, determining the location of the lesion, or quantifying the lesion.

One known method for reducing the imaging artifacts is to sort the image data into a plurality of gates based on a respiratory signal. One of the gates is then selected as the reference gate and the remaining gates are then registered to the reference gate. For example, the reference gate selected typically includes information that is collected at the end of the patient's breathing cycle. However, the reference gate having information collected at the end of the patient's breathing cycle may not include optimal information for registering the remaining gates. For example, the reference gate having information collected at the end of the patient's breathing cycle may not include a fewer number of pixels or pixels having a reduced pixel intensity. Thus, when the remaining gates are registered with the reference gate, the quality of the resultant image may be reduced.

BRIEF DESCRIPTION OF THE INVENTION

In one embodiment, a method for reducing, in an image, motion related imaging artifacts is provided. The method includes obtaining a four-dimensional (4D) image dataset of a region of interest, sorting the 4D image dataset into a plurality of gates, generating an image of the region of interest using the plurality of gates, quantifying a selected feature using at least one metric, selecting a reference gate from the plurality of gates based on the quantification of the feature, and registering one or more of the plurality of gates to the reference gate to generate an image of the selected feature.

In another embodiment, a medical imaging system including a scanner and a computer operationally coupled to the scanner is provided. The is programmed to obtain a four-dimensional (4D) image dataset of a region of interest, sort the 4D image dataset into a plurality of gates, generate an image of the region of interest using the plurality of gates, quantify a selected feature using at least one metric, select a reference gate from the plurality of gates based on the quantification of the feature, and register one or more of the plurality of gates to the reference gate to generate an image of the selected feature.

In a further embodiment, a non-transitory computer readable medium encoded with a program is provided. The program is programmed to instruct a computer to obtain a four-dimensional (4D) image dataset of a region of interest, sort the 4D image dataset into a plurality of gates, generate an image of the region of interest using the plurality of gates, quantify a selected feature using at least one metric, select a reference gate from the plurality of gates based on the quantification of the feature, and register one or more of the plurality of gates to the reference gate to generate an image of the selected feature.

DETAILED DESCRIPTION OF THE INVENTION

Figure 1:
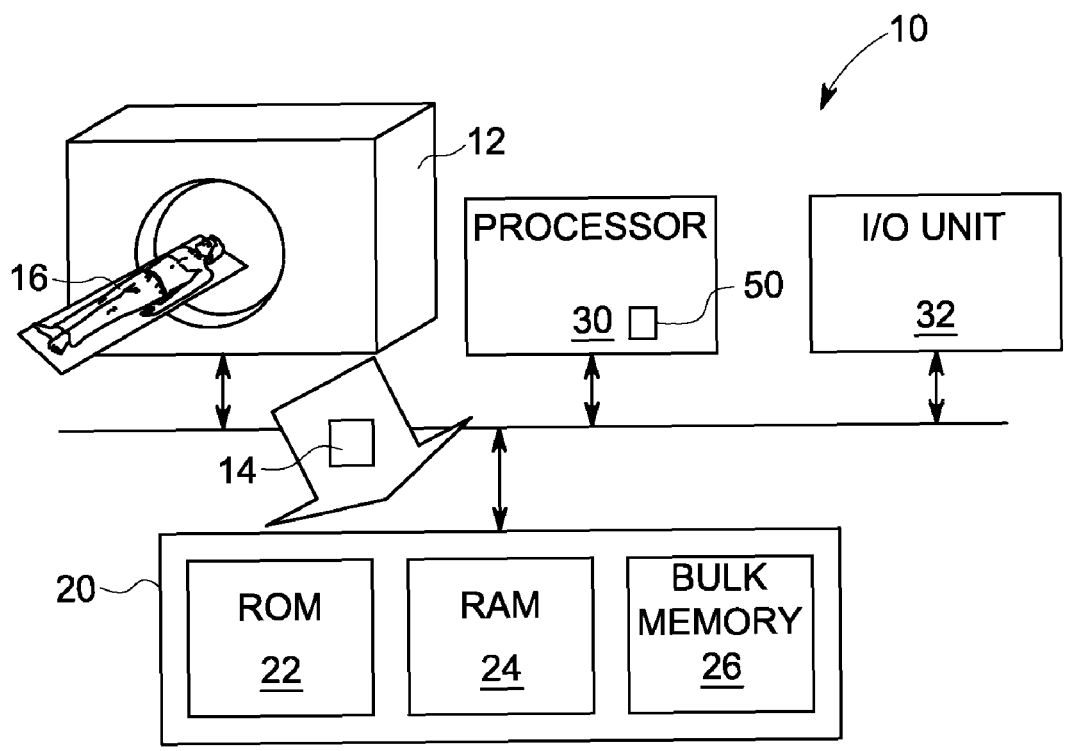
FIG. 1 is a simplified schematic illustration of an exemplary imaging system formed in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

FIG. 1 is a simplified block diagram that illustrates an exemplary Positron Emission Tomography (PET) imaging system 10. The PET imaging system 10 may include a PET scanner 12 that is operable to generate a four-dimensional (4D) emission dataset 14 of a patient 16. The 4D emission dataset 14 represents three spatial dimensions and time. The 4D emission dataset 14 may be stored in a memory device 20. The memory device 20 may include any combination of memory circuits, including electrical, magnetic, and/or optical systems. The memory device 20 may include, for example, a read only memory (ROM) 22, a random access memory (RAM) 24, and/or a bulk memory 26.

Figure 2:
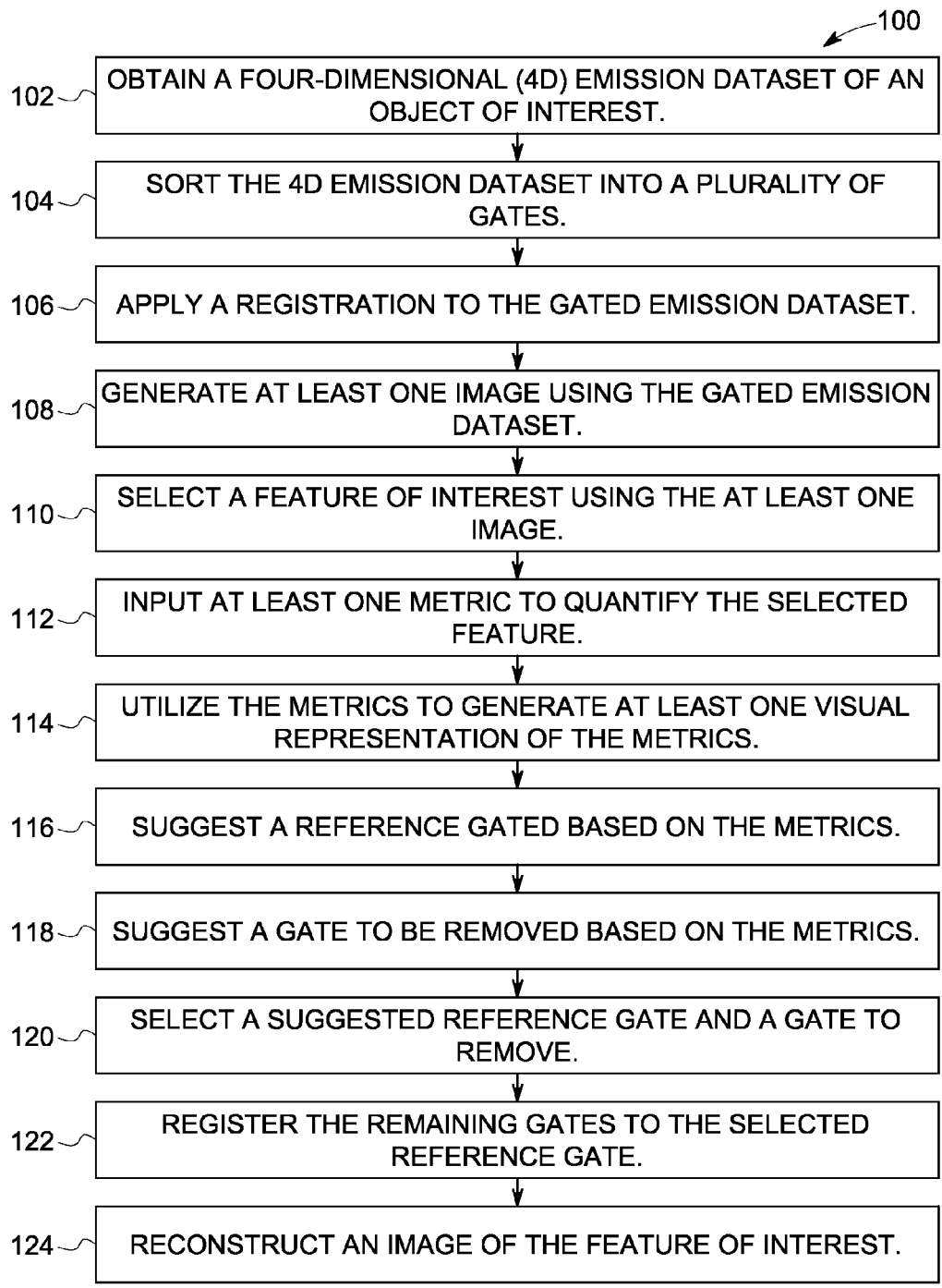
FIG. 2 is a flowchart of a method for reducing motion related imaging artifacts in accordance with various embodiments.

The memory device 20 may have stored therein program instructions to be executed by a processor 30. The program instructions may be written in any suitable computer language, e.g., Matlab. The processor 30 may be any one or combination of appropriate processing systems, such as, for example, a microprocessor, a digital signal processor, and a field programmable logic array, among others. The processing system may be embodied as any suitably appropriate computing device, e.g., a computer, personal digital assistant (PDA), laptop computer, notebook computer, a hard-drive based device, or any device that can receive, send, and store data. An input/output (I/O) device 32 may be provided for receiving user inputs and/or for providing outputs to a user. The I/O device 32 may also be a communication link which enables data to be transferred to and/or from other devices, e.g., over a network. The I/O device 32 may include a display device (not shown) for displaying a PET image. The I/O device 32 may include a device for receiving input from the user. For example, the device may include a mouse, trackball, or touch sensitive interface. The imaging system 10 also includes a feature quantification module 50 that is adapted to improve the quality of a 4D PET registration and therefore improve the quality of a reconstructed image. In the exemplary embodiment, the feature quantification module is installed in the processor 30. The feature quantification module may be implemented as a hardware device, as software, or a combination thereof FIG. 2 is a block diagram of an exemplary method that may be performed by the PET imaging system 10 shown in FIG. 1. In the exemplary embodiment, the method 100 may be implemented using the feature quantification module 50. More specifically, the method 100 may be provided as a machine-readable medium or media having instructions recorded thereon for directing the processor 30 to perform an embodiment of the method described herein. The medium or media may be any type of CD-ROM, DVD, floppy disk, hard disk, optical disk, flash RAM drive, or other type of computer-readable medium or a combination thereof The method 100 enables an operator to select various metrics that are then applied to the 4D emission dataset 14 to quantify at least one clinically relevant feature in the 4D emission dataset 14. Metric as used herein generally refers to a system of related measurements that facilitate quantifying some particular characteristics of an object, such as for example, a lesion or a tumor. The feature quantification module 50 may then gate the 4D emission dataset 14 based upon the metrics. Optionally, the metrics may be displayed to enable an operator to manually select a reference gate, and exclude other gates, utilizing the displayed metrics. More specifically, the operator may select the reference gate having the most clinically relevant information and remove gates that do not have clinically relevant information. After the operator has selected the reference gate and optionally, deselected any gates having non-clinically relevant information, the resultant gates are registered to the reference gate and an image is reconstructed. Optionally, the feature quantification module 50 may automatically select the reference gate and delete or deselect any gates having non-clinically relevant information. It should be realized that although the method 100 is described with respect to the emission dataset 14 obtained from the PET imaging system 10, the method 100 may also be applied to a transmission dataset obtained from a CT imaging system. Moreover, the method 100 may be applied to any image dataset or sinogram data obtained using any of the imaging modalities discussed herein, and the emission dataset 14 is exemplary only.

At 102, the 4D emission dataset 14 of the object 16 (each shown in FIG. 1) is obtained. In the exemplary embodiment, the emission dataset 14 is obtained using the PET imaging system 10 (shown in FIG. 1). The emission dataset 14 may be obtained by performing an emission scan of the object 16 to produce the emission dataset 14. Optionally, the emission dataset 14 may be obtained from data collected during a previous scan of the object 16, wherein the emission dataset 14 has been stored in a memory, such as the memory device 20 (shown in FIG. 1). The emission dataset 14 may be stored in any format, such as a list mode dataset, for example. The emission dataset 14 may be obtained during real-time scanning of the patient 16. For example, the methods described herein may be performed on emission data as the emission data is received from the PET scanner 12 during a real-time examination of the patient 16.

Figure 3:
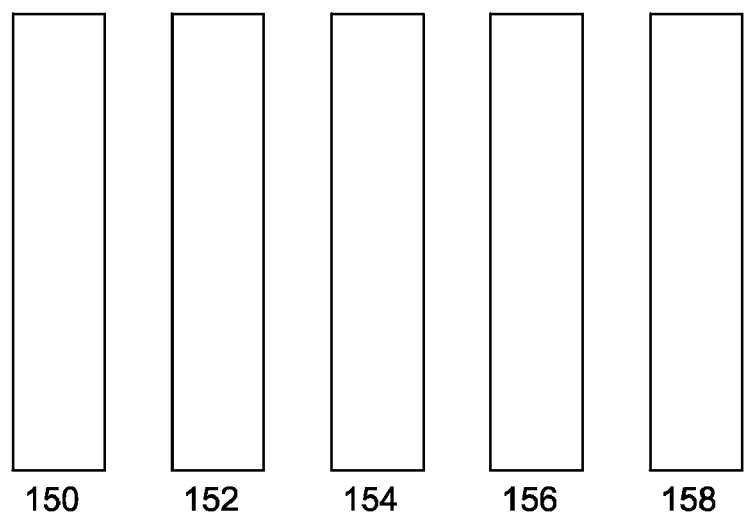
FIG. 3 is a simplified block diagram illustrating exemplary gates that may be formed in accordance with various embodiments.

At 104, the emission dataset 14 is sorted into a plurality of gates. For example, FIG. 3 illustrates a plurality of gates 150, 152, 154, 156, and 158. It should be realized that although FIG. 3 illustrates five gates 150, 152, 154, 156, and 158, the emission dataset 14 may be sorted into any quantity of gates, for example, based on the patient's breathing cycle. For example, the gate 150 may include information collected at the beginning of each breathing cycle and the gate 158 may include information collected at the end or expiration of the breathing cycle with each of gates 152, 154, and 156 having data that represents different phases in the breathing cycle between the inspiration phase and the expiration phase.

Referring again to FIG. 2, at 106, the gated emission data is registered. For example, and referring again to FIG. 3, in one embodiment, the feature quantification module 50 automatically selects a reference gate from one of the plurality of gates 150, 152, 154, 156, and 158 and registers the remaining gates to the reference gate. For example, the feature quantification module 50 may select the emission data in gate 150, which represents the emission data acquired at the end of breathing expiration, to be the reference gate. In this case, the remaining gates 152, 154, 156, and 158 are registered to the reference gate 150 using either a rigid registration or a non-rigid registration. The rigid and non-rigid registrations may be performed manually by the operator or automatically by the feature quantification module 50.

In the exemplary embodiment, performing a non-rigid registration includes transforming the information within the gates 152, 154, 156, and 158 in three-dimensional (3D) space to align the information within the gates 152, 154, 156, and 158 to the reference gate 150. For example, the images in the gates 152, 154, 156, and 158 may be slighted tilted with respect to the images in the reference gate 150. Accordingly, the images within the gate 152 are tilted to with the images in the reference gate 150. The remaining gates 154, 156, and 158 are also realigned to substantially align with the images in the reference gate 150. In operation, the rigid registration process may be implemented by selecting anatomical or other features/points/landmarks and the images aligned using these feature or points along with detected edges or borders within the images. Optionally, different markers may be used to identify known anatomical locations. The rigid registration also may be based on curved contours, for example, of bones within the image. The rigid registration may also be volume based or surface based. However, it should be appreciated that any rigid registration process may be performed that includes optimizing or calculating a certain comparable criteria or similarity measure.

In another embodiment, a global non-rigid registration procedure may be utilized to perform the motion correction on the information within the gates 150, 152, 154, 156, and 158. In operation, the global non-rigid registration or elastic registration includes non-rigid transformations. These non-rigid transformations allow local warping of image features and provide registrations that account for local deformations.

Non-rigid transformation approaches include, for example, polynomial warping, interpolation of smooth basis functions (thin-plate splines and wavelets), and physical continuum models (viscous fluid models and large deformation diffeomorphisms). The non-rigid registration is performed using the information sorted in the gates 150, 152, 154, 156, and 158. The global non-rigid registration may include, for example, warping of points or landmarks and providing a best fit along a contour with interpolation and correlation of the points or landmarks. Alternatively, a blending process may be performed that compares image voxels and blends corresponding regions. In general, the local non-rigid registration includes any type of elastic deformation model that allows for variations or movements in the different image sets.

Figure 4:
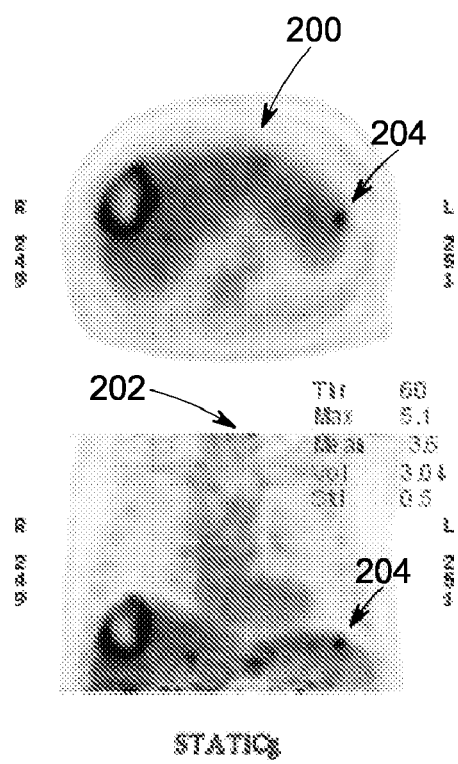
FIG. 4 are exemplary images that may be generated in accordance with various embodiments.

Referring again to FIG. 2, at 108, the 2D images stored in the gates 150, 152, 154, 156, and 158 are utilized to generate or reconstruct at least one image of the object 16. For example, FIG. 4 is an axial image 200 of a portion of the object 16 and image 202 is a coronal image 202 of the object 16 that may be generated as described above.

Referring again to FIG. 3, at 110, the operator selects a feature of interest using the at least one image generated at 108. For example, the operator may position a box around the feature 204 shown in FIG. 4 to select the feature 204. In the exemplary embodiment, the operator selects a clinical relevant feature, such as the feature 204. The feature quantification module 50 then utilizes various metrics to identify or suggest a reference gate and to identify and suggest gates that should not be used for reconstructing an image to provide an improved image that has reduced imaging artifacts.

Referring again to FIG. 2, at 112, the operator inputs at least one metric to quantify the feature 204. More specifically, the operator inputs at least one metric that enables the feature quantification module 50 to determine the quality of the emission data stored in each of the gates 150, 152, 154, 156, and 158. The metrics may include, for example, the mean value of the emission data store in each gate 150, 152, 154, 156, and 158, and/or the standard deviation of the emission data stored in each gate 150, 152, 154, 156, and 158 wherein gates having emission data that is approximately equal to the. The metrics may include any value that assists the feature quantification module 50 to automatically determine the quality of the gated emission data. The metrics may also include any value that assists the operator in determining the quality of the gated emission data. Such metrics may include, for example, the volume or number of voxels in each gate and/or the average intensity of the voxels in each gate.

Figure 5:
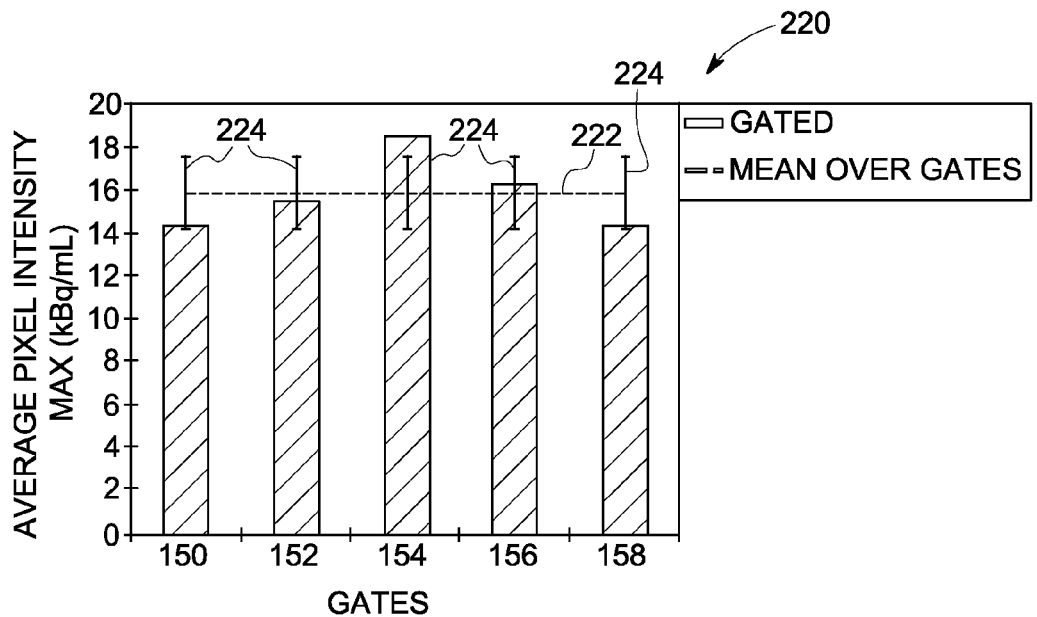
FIG. 5 is bar chart representing measured metrics that may be generated in accordance with various embodiments.

At 114, the metrics input at 112 may be utilized to plot or generate at least one visual representation or image of the gated emission data. For example, FIG. 5 is a bar chart 220 illustrating the average pixel intensity of the pixels in each of the gates 150, 152, 154, 156, and 158. The x-axis represents the gates 150, 152, 154, 156, and 158 and the y-axis represents the average pixel intensity of the pixels in each of the gates 150, 152, 154, 156, and 158. The dashed line 222 represents the mean value of the pixel intensities within the gates 150, 152, 154, 156, and 158 and the whisker plots 224 represent one standard deviation. It should be realized that in the exemplary embodiment, the metrics input at 112 are applied to the emission data stored in the gates 150, 152, 154, 156, and 158 to generate the bar chart 220 at 114. It should also be realized that plotting the metrics at 114 is optional. Specifically, the method 100 may be configured to automatically select the reference gate and any gates to be removed without generating the exemplary bar graphs described herein.

Figure 6:
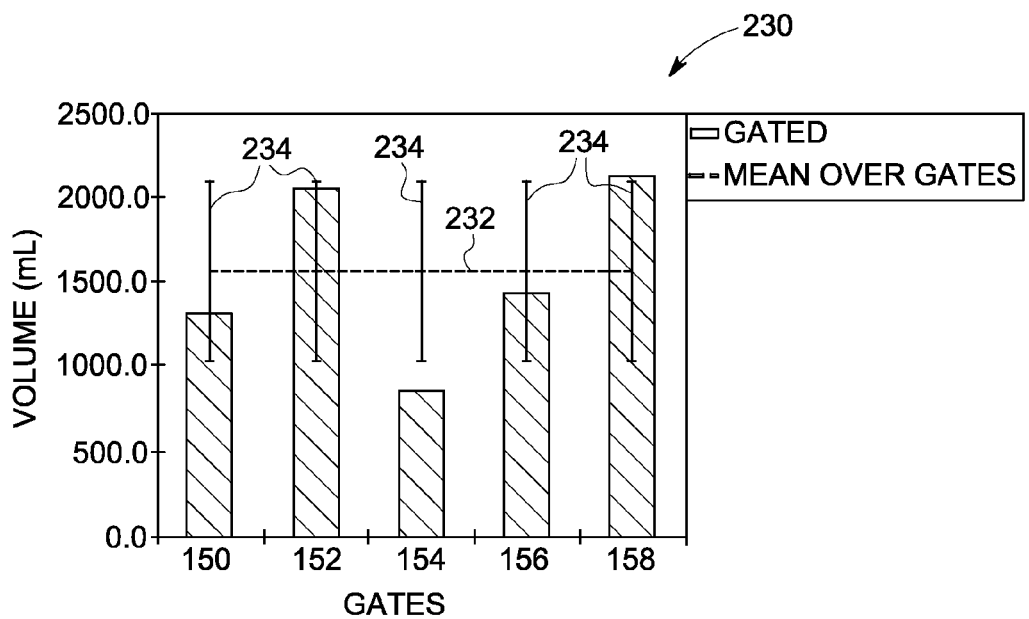
FIG. 6 is another bar chart representing measured metrics that may be generated in accordance with various embodiments.

FIG. 6 is another bar chart that may be generated using the metrics described above. More specifically, FIG. 6 is a bar chart 230 illustrating the volume or number of pixels in each of the gates 150, 152, 154, 156, and 158 The x-axis represents the gates 150, 152, 154, 156, and 158 and the y-axis represents the quantity or number of the pixels in each of the gates 150, 152, 154, 156, and 158. The dashed line 232 represents the mean value of the number of pixels within the gates 150, 152, 154, 156, and 158 and the whisker plots 234 represent one standard deviation. It should be realized that in the exemplary embodiment, the metrics input at 112 are applied to the emission data stored in the gates 150, 152, 154, 156, and 158 to generate the bar chart 230 at 114.

Referring again to FIG. 2, at 116, a new reference gate is suggested using the bar charts 220 and 230 described above. As discussed above, the reference gate is typically selected to be the gate that includes emission data acquired at the end of expiration. However, the quality of the emission data stored in the reference gate may not provide for optimal registration. Thus, the quality of an image reconstructed using this reference gate may not adequately compensate for motion related imaging artifacts.

For example, referring again to FIG. 5, the gates 150 and 158 include emission data having intensities that are less than the average pixel intensity 222 and also are approximately one standard deviation from the mean value of all the pixels in the gates 150, 152, 154, 156, and 158. Accordingly, the information in the bar chart 220 indicates that the gates 150 and 158 include potentially lower quality information because the pixel intensity of the information in gates 150 and 158 is less than the average pixel intensity value 222 and should not be utilized as the reference gate to perform image registration. Moreover, the gate 154 includes emission data that has average pixel intensities that are greater than the average pixel intensity 222 and also is greater than one standard deviation from the mean value of all the pixels in the gates 150, 152, 154, 156, and 158. Accordingly, the information in the bar chart 220 indicates that the gate 154 should not be utilized as the reference gate to perform image registration because the emission data in gate 154 has an average pixel intensity that is greater than one standard deviation.

However, gates 152 and 156 each include pixels having intensities that are approximately equal to the average pixel intensity 222 and are also less than one standard deviation from the mean value of all the pixels in the gates 150, 152, 154, 156, and 158. Accordingly, the information in the bar chart 220 indicates that either gate 152 or gate 156 may be selected as the reference gate because the gates 152 and 156 include emission data having the highest quality, i.e. the information within the gates 152 and 156 have pixel intensities that are approximately equal to the average pixel intensity 222 and are also less than one standard deviation from the mean value of all the pixels in the gate. Thus, in the exemplary embodiment, the motion correction module 150 may suggest, or visually prompt, he operator to select either gate 152 or gate 156 as the reference gate. Optionally, the motion correction module 150 may be configured to analyze the information in the image 220 and automatically suggest a reference gate to the operator. It should be realized that the operator may use the information provided in a single image, e.g. the bar chart 220 for example, to select a reference gate. Moreover, the feature quantification module 50 may analyze the metrics, without generating an image, and then suggest a reference gate to be utilized for registration.

Optionally, the operator may utilize a plurality of images to select a reference gate. For example, as discussed above, FIG. 6 illustrates a second metric, e.g. the volume of pixels in each of the gates 150, 152, 154, 156, 158, and 160. As shown in FIG. 6, the gates 150 and 154 include a volume of pixels that is substantially less than the average volume of pixels shown as the line 232. Moreover, the gate 154 also has a volume of pixels that is less than one standard deviation from the mean value of all the pixels in the gates 150, 152, 154, 156, and 158. Accordingly, the information in the bar chart 230 indicates that the gates 150 and 154 should preferably not be utilized as the reference gate to perform image registration. Moreover, the gate 154 includes emission data emission data that has average pixel intensities that are greater than the average pixel intensity 222 and also is greater than one standard deviation from the mean value of all the pixels in the gates 150, 152, 154, 156, and 158. Accordingly, the information in the bar chart 230 indicates that the gates 150 and 154 should not be utilized as the reference gate to perform image registration.

Moreover, the gates 152 and 158 include a volume of pixels that is substantially greater than the average volume of pixels shown as the line 232. Additionally, the gates 152 and 156 also have a volume of pixels that is approximately one standard deviation from the mean value of all the pixels in the gates 150, 152, 154, 156, and 158. Accordingly, the information in the bar chart 230 indicates that the gates 152 and 158 should preferably not be utilized as the reference gate to perform image registration.

However, the gate 156 includes pixels having intensities that are approximately equal to the average pixel intensity 232 and are also less than one standard deviation from the mean value of all the pixels in the gates 150, 152, 154, 156, and 158. Accordingly, the information in the bar chart 230 indicates that the gate 156 may be selected as the reference gate because the gate 156 includes emission data having the highest quality based on the pixel intensities and the standard deviation of the information within the gate 156. Thus, in the exemplary embodiment, the motion correction module 150 may suggest that the operator select the gate 156 as the reference gate. Optionally, the motion correction module 150 may be configured to analyze the information in the bar chart 220 and automatically suggest a reference gate to the operator. It should be realized that the operator may use the information provided in a single image, e.g. the bar chart 230 for example, to select a reference gate. Moreover, the feature quantification module 50 may analyze the metrics, without generating an image, and then suggest a reference gate to be utilized for registration. In this case, based on the analysis of both images 220 and 230, the feature quantification module preferably suggests the gate 156 as the reference gate by providing a visual indication to prompt the operator to select the gate 156 as the reference gate. Optionally, the operator may review the images 220 and 230 and then manually select the gate 156 as the reference gate.

Referring again to FIG. 2, at 118 gates to exclude from the registration process are determined as described above. In one embodiment, the feature quantification module may analyze the results of the metrics, shown visually in FIGS. 5 and 6, and the automatically suggest a gate to be excluded from the registration process. For example, as discussed above, and referring again to FIG. 6, the gate 154, specifically, includes a volume of pixels that is substantially less than the average volume of pixels shown as the line 232. Moreover, the gate 154 also has a volume of pixels that is less than one standard deviation from the mean value of all the pixels in the gates 150, 152, 154, 156, and 158. Accordingly, the information in the bar chart 230 indicates that the gate 154 may be too noisy to be beneficial to the image registration process to improve the quality of the resultant image. Therefore, at 118, the feature quantification module 50 may analyze the metrics, without generating an image, and then automatically suggest that gate 154 be excluded from the subsequent image registration process because the gate 154 includes emission data having the lowest quality based on the pixel intensities and the standard deviation of the information within the gate 154. Optionally, the operator may review the bar charts 220 and 230 and then manually exclude gate 154 from the subsequent image registration process.

At 120, the feature quantification module 50 identifies the reference gate based on the selection at 116 and also identifies any gates to be excluded from the registration process as discussed at 118. For example, in the exemplary embodiment, at 116 the gate 156 has been selected as the reference gate. Additionally, at 118 the gate 154 was selected to be excluded from the registration process.

At 122 the feature quantification module registers the remaining gates, e.g. the gates 150, 152, and 158 to the reference gate 156. The emission data in gates 150, 152, and 158 may be registered to the reference gate 156 using either a rigid registration or a global non-rigid registration as described above.

At 124, an image of the feature 204 is reconstructed using the registered gated data generated at 122.

Figure 7:
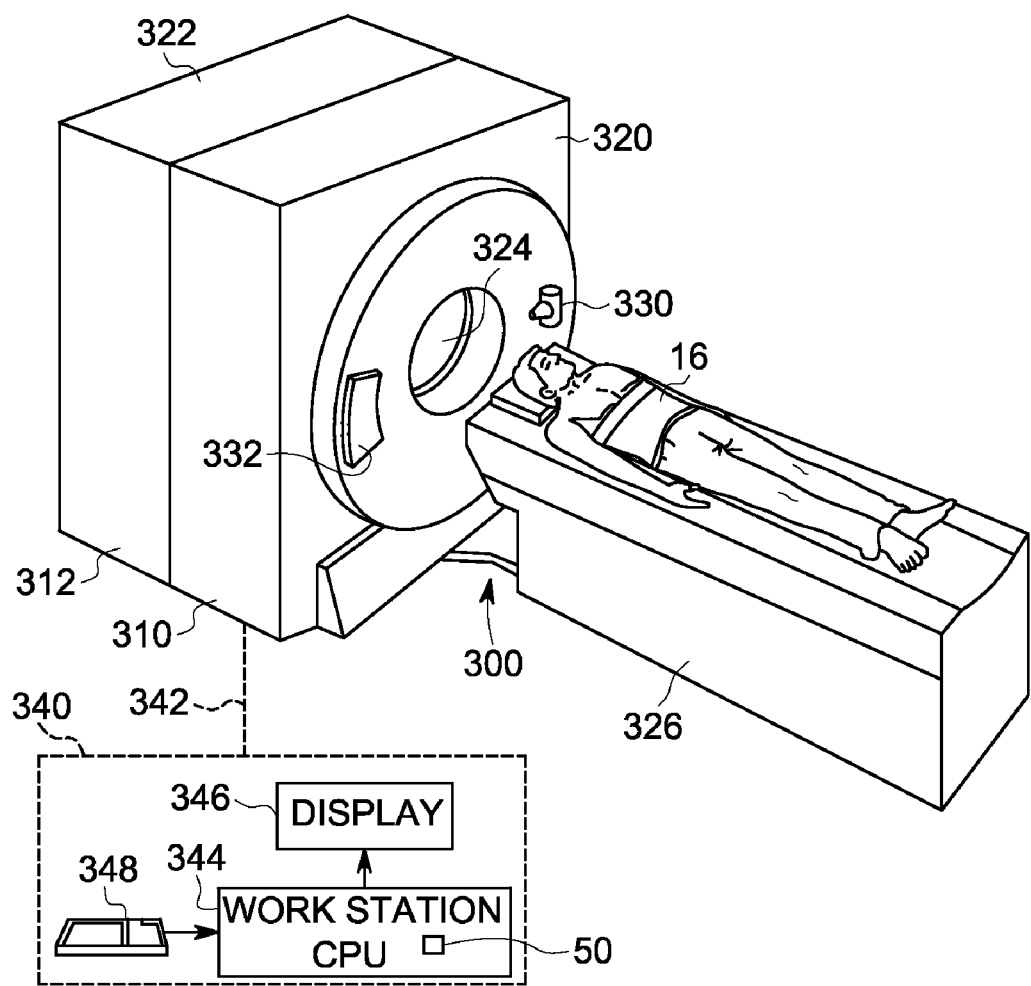
FIG. 7 is a pictorial illustration of an exemplary imaging system formed in accordance with various embodiments.

Various embodiments described herein may provide a multi-modality imaging system 400 as shown in FIG. 7. The multi-modality imaging system 400 may be any type imaging system, for example, different types of medical imaging systems, such as the Positron Emission Tomography (PET) 10 shown in FIG. 1, a Single Photon Emission Computed Tomography (SPECT), a Computed Tomography (CT), an ultrasound system, Magnetic Resonance Imaging (MRI) or any other system capable of generating diagnostic images. The various embodiments are not limited to multi-modality medical imaging systems, but may be used on a single modality medical imaging system such as a stand-alone PET imaging system, a stand-alone CT imaging system, an Magnetic Resonance Imaging (MRI), and a Photon Emission Computed Tomography (SPECT), for example. Moreover, the various embodiments are not limited to medical imaging systems for imaging human subjects, but may include veterinary or non-medical systems for imaging non-human objects, etc.

Referring to FIG. 7, the multi-modality imaging system 300 includes a first modality unit 310 and a second modality unit 312. The two modality units enable the multi-modality imaging system 300 to scan an object or patient 16 in a first modality using the first modality unit 310 and to scan the patient 16 in a second modality using the second modality unit 312. The multi-modality imaging system 300 allows for multiple scans in different modalities to facilitate an increased diagnostic capability over single modality systems. In one embodiment, the multi-modality imaging system 300 is a CT/PET imaging system 300, e.g. the first modality 310 is a CT imaging system and the second modality 312 is the PET imaging system 10. The imaging system 300 is shown as including a gantry 320 that is associated with the CT imaging system 310 and a gantry 322 that is associated with the PET imaging system 10. During operation, the patient 16 is positioned within a central opening 324, defined through the imaging system 300, using, for example, a motorized table 326.

The gantry 320 includes an x-ray source 330 that projects a beam of x-rays toward a detector array 332 on the opposite side of the gantry 320. The detector array 332 is formed by a plurality of detector rows (not shown) including a plurality of detector elements which together sense the projected x-rays that pass through the patient 16. Each detector element produces an electrical signal that represents the intensity of an impinging x-ray beam and hence allows estimation of the attenuation of the beam as the beam passes through the patient 16. During a scan to acquire x-ray attenuation data, the gantry 320 and the components mounted thereon rotate about a center of rotation. Additionally, the PET imaging system includes a detector (not shown) that is configured to acquire emission data.

During operation, the motorized table 326 moves the patient 16 into the central opening 324 of the gantry 320 and/or the gantry 322 in response to one or more commands received from the operator workstation 340. The workstation 340 then operates the first and second modalities 310 and 312 to both scan the patient 16 and acquire attenuation and/or emission data of the patient 16. The workstation 340 may be embodied as a personal computer (PC) that is positioned near the imaging system 300 and hard-wired to the imaging system 340 via a communication link 342. The workstation 340 may also be embodied as a portable computer such as a laptop computer or a hand-held computer that transmits information to, and receives information from, the imaging system 300. Optionally, the communication link 342 may be a wireless communication link that enables information to be transmitted to or from the workstation 340 to the imaging system 300 wirelessly. In operation, the workstation 340 is configured to control the operation of the imaging system 300 in real-time. The workstation 340 is also programmed to perform medical image diagnostic acquisition and reconstruction processes described herein. More specifically, the workstation 344 may include the feature quantification module 50 that is adapted to automatically select a reference gate and exclude gates having information from the registration process. The feature quantification module 50 is also configured to enable an operator to manually select a reference gate and manually exclude gates from the registration process as is discussed in more detail above.

The operator workstation 340 includes a central processing unit (CPU) or computer 344, a display 346, and an input device 348. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 344 executes a set of instructions that are stored in one or more storage elements or memories, in order to process information received from the first and second modalities 310 and 312. The storage elements may also store data or other information as desired or needed.

The storage element may be in the form of an information source or a physical memory element located within the computer 344.

The set of instructions may include various commands that instruct the computer 344 as a processing machine to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

The computer 344 connects to the communication link 342 and receives inputs, e.g., user commands, from the input device 348. The input device 348 may be, for example, a keyboard, mouse, a touch-screen panel, and/or a voice recognition system, etc. Through the input device 348 and associated control panel switches, the operator can control the operation of the CT imaging system 310 and the PET imaging system 10 and the positioning of the patient 16 for a scan. Similarly, the operator can control the display of the resulting image on the display 346 and can perform image-enhancement functions using programs executed by the computer 344.

A technical effect of some of the various embodiments described herein is to utilize operator selected metrics to analyze the imaging data within each of the gates and then select a reference gate and/or exclude at least one of the gates based on the analysis. The remaining gates are then registered to the reference gate using a non-global rigid registration process to provide for improved motion compensation. More specifically, the reference gate typically affects the final image. Therefore, various embodiments, utilize metrics to quantify features across all the gates, select a reference gate based on the metrics generated of the feature and also remove gates that based on the metrics. Various embodiments enable a computer to automatically suggest the reference gate if the reference gate is within a predetermined percentage of the mean or standard deviation across all the gates for a feature of interest. Moreover, the computer may automatically suggest removing certain gates that lie outside a user-selectable range, e.g. greater or lesser than 20% of the standard deviation or mean. If a new reference gate is selected, the registration is again performed using the newly selected reference gate. As a result, the registration process using the newly selected reference gate, while potentially excluding at least one gate, generates an image of the feature using the selected reference gate while concurrently excluding image data that may be effected by motion Various embodiments described herein provide a tangible and non-transitory machine-readable medium or media having instructions recorded thereon for a processor or computer to operate an imaging apparatus to perform an embodiment of a method described herein. The medium or media may be any type of CD-ROM, DVD, floppy disk, hard disk, optical disk, flash RAM drive, or other type of computer-readable medium or a combination thereof The various embodiments and/or components, for example, the monitor or display, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A method for reducing, in an image, motion related imaging artifacts, said method comprising:
    obtaining a four-dimensional (4D) image dataset of a region of interest;
    sorting the 4D image dataset into a plurality of gates;
    generating an image of the region of interest using the plurality of gates;
    quantifying a selected object in each of the gates using at least one metric, the metric including at least one of object maximum intensity, object mean intensity, object volume or object displacement;
    selecting a reference gate from the plurality of gates based on the quantification of the object; and
    registering one or more of the plurality of gates to the reference gate to generate an image of the selected object.

2. The method of claim 1, wherein the 4D image dataset is sorted into a plurality of gates; said method further comprising:
    plotting the at least one metric using the plurality of gates; and
    displaying the results of the plotting to enable an operator to manually select the reference gate.

3. The method of claim 1, wherein the 4D image dataset is sorted into a first set of gates, said method further comprising:
    plotting the at least one metric using the first set of gates;
    displaying the results of the plotting to enable an operator to manually select the reference gate to generate a second set of gates; and
    performing a global non-rigid reconstruction using the second set of gates.

4. The method of claim 1, wherein the 4D image dataset is sorted into a first set of gates; said method further comprising:
    plotting the at least one metric using the first set of gates;
    displaying the results of the plotting to enable an operator to manually remove at least one of the gates to generate a second set of gates; and
    performing a global non-rigid reconstruction using the second set of gates.

5. The method of claim 1, wherein the 4D image dataset is sorted into a first set of gates; said method further comprising:
    automatically analyzing the at least one metric; and
    automatically suggesting the reference gate based on the automatic analyzing.

6. The method of claim 1, wherein the 4D image dataset is sorted into a first set of gates; said method further comprising:
    automatically analyzing the at least one metric;
    automatically suggesting a gate to remove from the first set of gates to form a second set of gates; and
    performing a rigid reconstruction using the second set of gates.

7. The method of claim 1, further comprising:
    automatically sorting the image dataset into a plurality of gates; and
    performing a non-rigid registration on the plurality of gates to generate the image of the region of interest.

8. The method of claim 1, wherein quantifying the object using at least one metric, further comprises: selecting at least one of a volume of pixels in each gate or an average pixel intensity as the metric.

9. The method of claim 1, wherein obtaining the image dataset further comprises obtaining at least one of a four-dimensional (4D) Positron Emission Tomography (PET) emission dataset and a 4D Single Photon Emission Computed Tomography (SPECT) emission dataset.

10. A medical imaging system comprising a scanner and a computer operationally coupled to the scanner, wherein the computer is programmed to:
    obtain a four-dimensional (4D) imaging dataset of an object using the scanner;
    sort the 4D image dataset into a plurality of gates;
    generate an image of the region of interest using the plurality of gates;
    quantify a selected object in each of the gates using at least one metric, the metric including at least one of object maximum intensity, object mean intensity, object volume or object displacement;
select a reference gate from the plurality of gates based on the quantification of the object; and
register one or more of the plurality of gates to the reference gate to generate an image of the selected object.

11. The medical imaging system of claim 10, wherein the computer is further programmed to
plot the at least one metric using the plurality of gates; and
display the results of the plotting to enable an operator to manually select the reference gate.

12. The medical imaging system of claim 10, wherein the computer is further programmed to:
plot the at least one metric using the first set of gates;
display the results of the plotting to enable an operator to manually select the reference gate to generate a second set of gates; and
perform a global non-rigid reconstruction using the second set of gates.

13. The medical imaging system of claim 10, wherein the computer is further programmed to:
plot the at least one metric using the first set of gates;
display the results of the plotting to enable an operator to manually remove at least one of the gates to generate a second set of gates; and
perform a global non-rigid reconstruction using the second set of gates.

14. The medical imaging system of claim 10, wherein the computer is further programmed to:
automatically analyze the at least one metric; and
automatically suggest the reference gate based on the automatic analyzing.

15. The medical imaging system of claim 10, wherein the computer is further programmed to:
automatically analyze the at least one metric;
automatically suggest a gate to remove from a first set of gates to form a second set of gates; and
perform a rigid reconstruction using the second set of gates.

16. The medical imaging system of claim 10, wherein the computer is further programmed to:
automatically sort the image dataset into a plurality of gates;
perform a non-rigid registration on the plurality of gates to generate the image of the region of interest.

17. A non-transitory computer readable medium encoded with a program programmed to instruct a computer to:
acquire a four-dimensional (4D) imaging dataset of an object using the scanner;
sort the 4D image dataset into a plurality of gates;
generate an image of the region of interest using the plurality of gates;
quantify a selected object in each of the gates using at least one metric, the metric including at least one of object maximum intensity, object mean intensity, object volume or object displacement;
select a reference gate from the plurality of gates based on the quantification of the object; and
register one or more of the plurality of gates to the reference gate to generate an image of the selected object.

18. A computer readable medium in accordance with claim 17, said computer readable medium is further programmed to instruct a computer to:
plot the at least one metric using the plurality of gates; and
display the results of the plotting to enable an operator to manually select the reference gate.

19. A computer readable medium in accordance with claim 17, said computer readable medium is further programmed to instruct a computer to:
plot the at least one metric using the first set of gates;
display the results of the plotting to enable an operator to manually select the reference gate to generate a second set of gates; and
perform a global non-rigid reconstruction using the second set of gates.

20. A computer readable medium in accordance with claim 17, said computer readable medium is further programmed to instruct a computer to:
plot the at least one metric using the first set of gates;
display the results of the plotting to enable an operator to manually remove at least one of the gates to generate a second set of gates; and
perform a global non-rigid reconstruction using the second set of gates.

* * * * *